United States Patent
Abgrall et al.

(10) Patent No.: US 10,134,217 B2
(45) Date of Patent: Nov. 20, 2018

(54) SECURE ELECTRONIC ENTITY INTEGRATING LIFE SPAN MANAGEMENT OF AN OBJECT

(75) Inventors: Renan Abgrall, Paris (FR); Bernard Geffrotin, Meudon (FR)

(73) Assignee: IDEMIA FRANCE, Colombes (FR)

( * ) Notice: Subject to any disclaimer, the term of this patent is extended or adjusted under 35 U.S.C. 154(b) by 2481 days.

(21) Appl. No.: 10/536,493

(22) PCT Filed: Nov. 21, 2003

(86) PCT No.: PCT/FR03/03453
§ 371 (c)(1),
(2), (4) Date: Jan. 20, 2006

(87) PCT Pub. No.: WO2004/051558
PCT Pub. Date: Jun. 17, 2004

(65) Prior Publication Data
US 2006/0129849 A1    Jun. 15, 2006

(30) Foreign Application Priority Data
Nov. 25, 2002 (FR) .................................... 02 14768

(51) Int. Cl.
G07F 7/10 (2006.01)
G04F 1/00 (2006.01)
G04F 10/00 (2006.01)
G06Q 20/34 (2012.01)
G07C 1/10 (2006.01)
G06K 19/073 (2006.01)
(Continued)

(52) U.S. Cl.
CPC ............ *G07F 7/1008* (2013.01); *G04F 1/005* (2013.01); *G04F 10/00* (2013.01); *G06K 19/073* (2013.01); *G06Q 20/341* (2013.01); *G06Q 20/4093* (2013.01); *G07C 1/10* (2013.01); *G07F 7/084* (2013.01)

(58) Field of Classification Search
CPC ......... G07C 1/10; G07F 7/1008; G04F 1/005; G04F 10/00; G06Q 20/341
USPC .................. 235/377, 380, 487, 492; 368/109
See application file for complete search history.

(56) References Cited

U.S. PATENT DOCUMENTS

| 4,710,613 A | 12/1987 | Yoshimi |
| 4,808,802 A * | 2/1989 | Kano .................. G06Q 20/341 235/380 |
| 5,014,311 A | 5/1991 | Hartmut |

(Continued)

FOREIGN PATENT DOCUMENTS

| DE | 30 41 109 | 6/1982 |
| DE | 44 41 038 | 5/1996 |

(Continued)

*Primary Examiner* — Daniel Walsh
(74) *Attorney, Agent, or Firm* — Young & Thompson

(57) ABSTRACT

A secure electronic entity, adapted to store at least one object, includes a unit for measuring the passage of time as from a reference date associated with the object. It includes a unit for storing a life span assigned to the object cooperating with the time measuring unit so as to compare the time elapsed and the life span. It further includes an updating and invalidating unit, to update the object life span or to temporarily or permanently disable the object if the comparison shows that the time elapsed exceeds the life span. The invention is in particular applicable to smart cards.

26 Claims, 2 Drawing Sheets

(51) Int. Cl.
*G06Q 20/40* (2012.01)
*G07F 7/08* (2006.01)

(56) References Cited

U.S. PATENT DOCUMENTS

| | | | | |
|---|---|---|---|---|
| 5,514,995 | A * | 5/1996 | Hennig | 327/399 |
| 6,294,997 | B1 * | 9/2001 | Paratore et al. | 340/572.1 |
| 6,373,201 | B2 * | 4/2002 | Morgan et al. | 315/291 |
| 6,425,289 | B1 * | 7/2002 | Igel | G01L 9/0073 73/715 |
| 6,543,686 | B1 * | 4/2003 | Ritter | 235/380 |
| 6,546,294 | B1 * | 4/2003 | Kelsey | G05B 23/0283 348/231.3 |
| 7,036,018 | B2 * | 4/2006 | Horvat et al. | 713/189 |
| 7,818,491 | B2 * | 10/2010 | Baba | 711/103 |
| 8,577,337 | B2 * | 11/2013 | O'Leary | H04W 8/22 455/410 |
| 2001/0019302 | A1 * | 9/2001 | Yatsu et al. | 340/5.2 |
| 2001/0023472 | A1 * | 9/2001 | Kubushiro et al. | 711/103 |
| 2003/0227827 | A1 * | 12/2003 | Elizalde et al. | 368/109 |
| 2005/0135411 | A1 * | 6/2005 | Sureaud | G06K 19/073 370/463 |
| 2005/0167509 | A1 * | 8/2005 | Liu | B43K 29/093 235/486 |
| 2006/0129849 | A1 * | 6/2006 | Abgrall | G04F 1/005 713/300 |
| 2006/0145994 | A1 * | 7/2006 | Huitema | G09G 3/006 345/98 |
| 2006/0163369 | A1 * | 7/2006 | Dischamp | G06K 19/073 235/492 |
| 2007/0001680 | A1 * | 1/2007 | Khoo | G01R 31/3655 324/430 |
| 2007/0129078 | A1 * | 6/2007 | De Beer | 455/445 |
| 2007/0201821 | A1 * | 8/2007 | Sato | H04N 5/913 386/291 |
| 2007/0263444 | A1 * | 11/2007 | Gorobets et al. | 365/185.09 |
| 2007/0266200 | A1 * | 11/2007 | Gorobets et al. | 711/103 |
| 2008/0082725 | A1 * | 4/2008 | Elhamias | 711/103 |
| 2008/0082726 | A1 * | 4/2008 | Elhamias | 711/103 |
| 2008/0098158 | A1 * | 4/2008 | Kitahara | 711/103 |
| 2010/0176733 | A1 * | 7/2010 | King | H05B 37/0245 315/158 |
| 2010/0205374 | A1 * | 8/2010 | Meka et al. | 711/117 |
| 2010/0241797 | A1 * | 9/2010 | Kitahara | 711/103 |
| 2010/0332922 | A1 * | 12/2010 | Chang et al. | 714/704 |
| 2013/0069658 | A1 * | 3/2013 | Rich | H01M 10/48 324/426 |
| 2013/0093595 | A1 * | 4/2013 | Lee | G01R 31/1236 340/635 |

FOREIGN PATENT DOCUMENTS

| | | |
|---|---|---|
| DE | 196 16 943 | 10/1997 |
| DE | 198 21 013 | 11/1999 |
| FR | 2 707 409 | 1/1995 |

* cited by examiner

SECURE ELECTRONIC ENTITY INTEGRATING LIFE SPAN MANAGEMENT OF AN OBJECT

The invention relates to a secure electronic entity adapted to store one or more objects and in particular seeks to improve this kind of electronic entity so that it is able to manage a lifespan assigned to the object, running from a reference time of day associated with the object.

References hereinafter to managing time "in" the electronic entity mean management independent of any external time measuring system, for example a clock signal generator or any other means of measuring time external to the electronic entity.

Its specific features make the electronic entity of the present invention relatively inviolable.

Throughout the remainder of the description, the lifespan of an object is either a total time of use of the object or a fixed time selected in advance and independent of the real time of use of the object.

The invention may be applied to any secure electronic entity, for example a secure microcircuit card including means enabling it to be coupled at least temporarily to an electrical power supply to carry out one or more operations. The invention can in particular be used to manage the lifespan of the card itself or of objects contained in the card in the absence of a continuous power supply.

The electronic entity can be a microcircuit card, for example, such as a bank card, an access control card, an identity card, a SIM card or a memory card such as a Panasonic SD (Secured Digital) card or a PCMCIA (Personal Computer Memory Card International Architecture) card, for example an IBM 4758 card.

The security of an object stored in this kind of electronic entity may be improved if it is possible to take account of the time that has elapsed since a reference time of day related to that object, whether the object is the operating system of the card, a secret code (PIN, key, certificate), a data file, a file system, an application or access rights.

There are applications, such as Digital Rights Management (DRM) applications, that necessitate the use of a certified time, i.e. of secure time measurement.

Moreover, limiting the validity time of secret data stored in a microcircuit card, such as a key, a certificate or a PIN, makes the card more secure.

Moreover, limiting the validity time can be used to manage certain objects in the card, for example to manage successive versions of an application or "garbage collection", i.e. freeing up memory space corresponding to objects that are no longer used.

As far as the applicant knows, in prior microcircuit cards, there is no way of measuring time securely and autonomously or to limit the validity time of objects stored in the card. This increases the probability of pirating of such objects by allowing a fraudster the opportunity to misuse them fraudulently, for example by supplying a false time indication to the card.

An object of the present invention is to remedy these drawbacks by preventing an attacker fraudulently using a secure electronic entity or one or more objects stored therein. To this end, the present invention integrates into the electronic entity management of the duration of the assigned lifespan of the object or objects concerned or even of the electronic entity itself.

To this end, the invention proposes a secure electronic entity including means adapted to store one or more objects, which entity is noteworthy in that it includes:

a unit for measuring the time that has elapsed from a reference time of day associated with said object, a unit for storing a lifespan assigned to the object, the storage unit co-operating with the time measuring unit to compare the elapsed time and the lifespan, and an updating and invalidation unit for updating the lifespan of the object or to render the object temporarily or permanently unusable if the result of said comparison is that the elapsed time has reached or passed the lifespan.

According to the invention, the means for determining the elapsed time from the reference time of day are situated in the electronic entity, which makes it more secure.

As indicated above, said lifespan either corresponds to the total time of real use of the object or is a time period independent of the total time of real use of the object.

If the lifespan is independent of the total real time of use of the object, the reference time of day is a time of day that marks the beginning of the time measurement. It may be stored in the electronic entity, but this is optional. If the lifespan corresponds to the total real time of use of the object, the elapsed time is measured on each use of the object, the reference time of day being the time of day at which each use starts.

The time measuring unit is advantageously adapted to provide a measurement of the time that has elapsed since the reference time of day even when the electronic entity is not supplied with power by an external power supply.

The time measuring unit is advantageously adapted to supply a measurement of the time that has elapsed since the reference time of day even when the electronic entity is not supplied with electrical power.

The time measuring unit is advantageously adapted to supply a measurement of the time that has elapsed since the reference time of day independently of any external clock signal.

In this sense, the electronic entity is autonomous both from the time measurement point of view and from the electrical power supply point of view.

Alternatively, a battery and/or a clock can be provided in the electronic entity, of course.

The time measuring unit may include means for comparing two times of day, a time of day generally being an expression of the current time, and the two times of day being understood in the present context as being two times defined relative to the same time reference, for example the reference time of day associated with the object whose lifespan is monitored by the electronic entity. The comparison means may compare the current time of day directly to the reference time of day of the object, which means that the remaining lifespan of the object may be deduced directly. Alternatively, each time the object is used, the comparison means may compare the time of day at the end of use with the time of day at the start of use and add the resulting time period to the time periods calculated for previous uses of the object. The comparison means then check if that cumulative time period is greater than the lifespan fixed for the object.

The unit for storing the lifespan advantageously includes a secure entity and may be situated inside or outside the electronic entity.

As mentioned in the introduction, by way of non-limiting example, the object may be the operating system of a card, a secret code (PIN, key or certificate), a file or a file system, an application or access rights. The reference time of day associated with the object may be the time of day at which the object was created in the electronic entity.

In a preferred embodiment of the present invention, the secure electronic entity includes one or more subsystems comprising:

a capacitive component subject to leakage across its dielectric space, means being provided for coupling said capacitive component to an electrical power supply to be charged by said electrical power supply, and means for measuring the residual charge in the capacitive component, said residual charge being at least in part representative of the time that has elapsed since the capacitive component was decoupled from the electrical power supply.

In this case, the capacitive component of the subsystem cited above can be charged only when the secure electronic entity is coupled to the electrical power supply, which may be external to the secure electronic entity, although that is not essential; the electronic entity may instead be supplied with power by a battery in or on it.

The electronic entity may be provided with means for decoupling the capacitive component from the electrical power supply, this event initializing the time measurement.

More generally, measurement of time, i.e. variation of the charge in the capacitive component, begins, after it has been charged, as soon as the component is electrically insulative from any other circuit and can be discharged only across its own dielectric space.

However, even if the residual charge measured is physically linked to the time that has elapsed between isolating the capacitive component and a given measurement of its residual charge, a measured time interval may be determined between two measurements, the first measurement determining a reference residual charge, as it were. The means for measuring the residual charge in the capacitive component are used to determine an elapsed time.

The capacitive component is charged during use of the object whose lifespan is monitored by the electronic entity, the term "use" being understood in the widest sense and including, for example, the creation of the object. During such use the means for measuring the residual charge provide information that is representative either of the elapsed time since the reference time of day or of the total time of use of the object, depending on whether the lifespan of the object is independent of the real time of use of the object.

Moreover, the invention further enables the secure electronic entity to continue to measure the elapsed time even after it has been temporarily supplied with power and has then been deprived of any further electrical power supply. Thus the invention does not necessitate the use of a continuous electrical power supply.

The means for measuring the residual charge may be included in the time measuring unit referred to above.

In a preferred embodiment, the means for measuring the residual charge comprise a field-effect transistor whose gate is connected to a terminal of the capacitive component, i.e. to a "plate" of a capacitor.

A capacitor of the above kind may be implemented in the MOS technology and its dielectric space may then consist of a silicon oxide. In this case, it is advantageous for the field-effect transistor also to be implemented in the MOS technology. The gate of the field-effect transistor and the "plate" of the MOS capacitive component are connected together and constitute a kind of a floating gate that may be connected to a component for injecting charge carriers.

There may also be no electrical connection as such with the external environment. The connection of the floating gate may be replaced by an (electrically insulative) control gate that charges the floating gate, for example by means of a tunneling effect or "hot carriers". The gate causes charge carriers to migrate toward the floating gate common to the field-effect transistor and the capacitive component. This technique is well known to EPROM and EEPROM manufacturers.

The field-effect transistor and the capacitive component may constitute a unit integrated into a microcircuit contained in the secure electronic entity or forming part of another microcircuit housed in another secure entity, such as a server.

At certain times, both periodic and otherwise, during use of the object whose lifespan is monitored by the secure electronic entity, when the secure electronic entity is coupled to an external electrical power supply, the capacitive component is charged to a predetermined value, which is either known or measured and stored, and the means for measuring the residual charge are connected to a terminal of the capacitive component.

If the object is not being used, the means for measuring the residual charge, and in particular the field-effect transistor, are no longer supplied with power, but the gate of the transistor connected to the terminal of the capacitive component is at a voltage corresponding to the charge therein.

If the lifespan is independent of the real time of use of the object throughout the period of time between the reference time of day associated with the object and the time of day of its current use, the capacitive component is slowly discharged across its own dielectric space with the result that the voltage applied to the gate of the field-effect transistor is progressively reduced.

When the electronic entity is again connected to an electrical power supply, if the object is used again, an electrical voltage is applied between the drain and the source of the field-effect transistor. This generates an electric current from the drain to the source (or in the opposite direction, as appropriate), which current may be connected and analyzed.

The value of the measured electrical current depends on the technological parameters of the field-effect transistor, on the potential difference between the drain and the source, and the voltage between the gate and the substrate. The current therefore depends on charge carriers accumulated in the floating gate common to the field-effect transistor and to the capacitive component. Consequently, that drain current is also representative of the elapsed time between the reference time of day and the current time of day.

The leakage current of the above kind of capacitor depends of course on the thickness of its dielectric space and on other technological parameters such as the contact lengths and areas of the elements of the capacitive component. It is also necessary to take into account the three-dimensional architecture of the contacts between these parts, which may induce phenomena modifying the parameters of the leakage current (for example, modification of the tunnel capacitance). The type and quantity of dopants and defects may be modulated to modify the characteristics of the leakage current.

Temperature variations, to be more precise the average of the calorific energy input to the secure electronic entity during the time of use of the object, also have an influence. In fact, any parameter intrinsic to the MOS technology may be a source of modulation of the time measurement process.

The thickness of the insulative layer of the field-effect transistor is advantageously significantly greater (for example approximately three times) than the thickness of the insulative layer of the capacitive component.

The thickness of the insulative layer of the capacitive component is advantageously from 4 nanometers to 10 nanometers.

To obtain information that is representative substantially of only time, in another embodiment, at least two subsystems as defined herein above may be operated "in parallel". The two temperature-sensitive capacitive components are designed with different leaks, all other things being equal, i.e. their dielectric spaces (the thickness of the silicon oxide layer) have different thicknesses.

To this end, in one advantageous embodiment of the invention, the electronic entity defined hereinabove is noteworthy in that it includes:

at least two of the previously mentioned subsystems each comprising:

a capacitive component subject to leakage across its dielectric space, means enabling said capacitive component to be coupled to an electrical power supply in order to be charged by said electrical power supply, and means for measuring the residual charge in the capacitive component, said residual charge being at least in part representative of the time which has elapsed after the capacitive component was decoupled from the electrical power supply, said subsystems comprising capacitive components having different leaks across their respective dielectric spaces, and said secure electronic entity further including means for processing respective measured residual charges in said capacitive components to extract from said measurements information substantially independent of heat input to said entity during the time that has elapsed since the reference time of day.

For example, the processing means may include a table of stored time values addressed by the respective measurements. In other words, each pair of measurements designates a stored time value independent of temperature and temperature variations during the measured period. The electronic entity advantageously includes a memory associated with a microprocessor and a portion of that memory may be used to store the table of values.

Alternatively, the processing means may include calculation software programmed to execute a predetermined function for calculating time information, substantially independent of calorific input, as a function of the two measurements cited above.

The invention is particularly suitable for application to microcircuit cards. The secure electronic entity may be a microcircuit card such as a bank card, an access control card, an identity card, a SIM card or a memory card (such as a Panasonic SD card), or may contain a microcircuit card, or may be of another type, for example a PCMCIA card (such as an IBM 4758 card).

The invention is also noteworthy by virtue of its level of integration.

BRIEF DESCRIPTION OF THE DRAWINGS

Further aspects and advantages of the invention will become apparent on reading the following detailed description of particular embodiments of the invention, provided by way of non-limiting example. The description refers to the accompanying drawings.

DETAILED DESCRIPTION OF THE PREFERRED EMBODIMENTS

Figure 1:
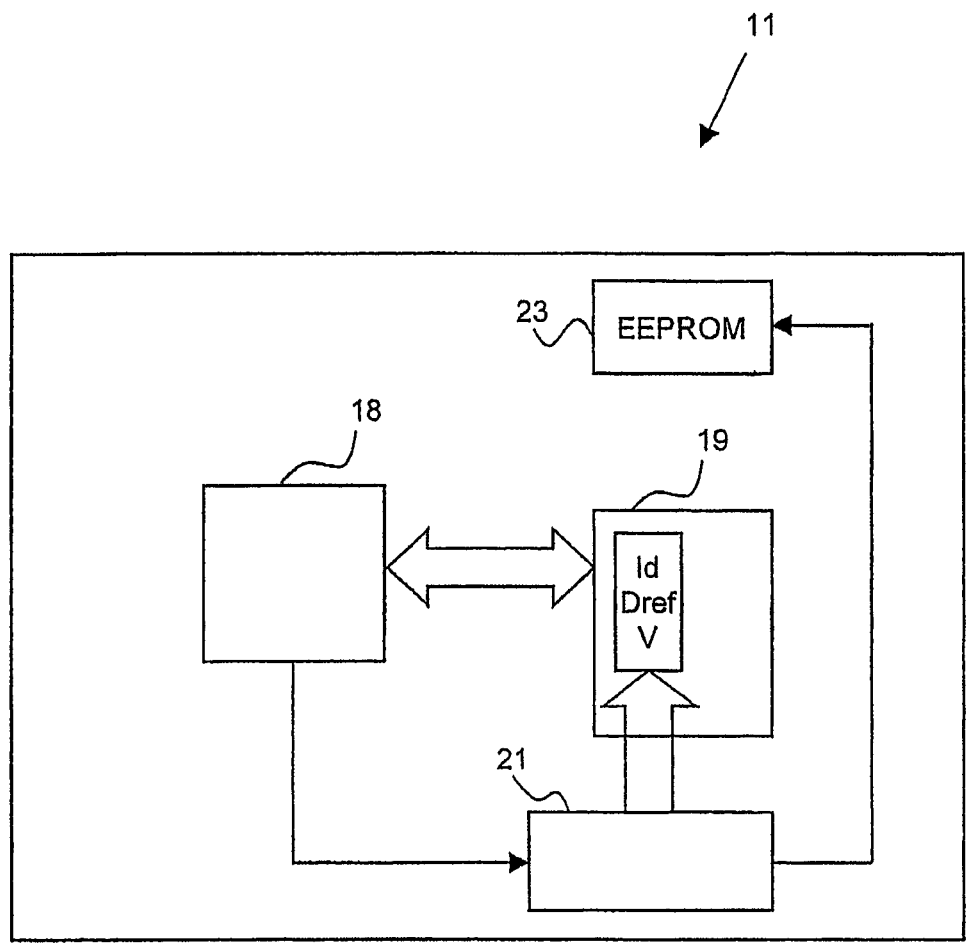
FIG. 1 is a block diagram of one particular embodiment of a secure electronic entity conforming to the present invention.

As shown in FIG. 1, in one particular embodiment, a secure electronic entity 11 conforming to the present invention includes a non-volatile memory 23, for example of the EEPROM type, storing data relating to one or more objects, such as an operating system, a secret code (PIN, encryption key or certificate, for example), a file or a system of files, an application or access rights.

One particular embodiment is described hereinafter in which the lifespan selected for an object is independent of the real time of use of that object.

The electronic entity 11 contains a unit 18 for measuring the time that elapses from a reference time of day Dref associated with the object stored in the EEPROM 23. The reference time of day may be the time of day the object was created in the card, for example.

The time measuring unit 18 is independent of any external time measuring system, for example a clock signal generator or other means of measuring time external to the card.

The secure electronic entity 11 also includes a unit 19 for storing a plurality of parameters defining the object whose lifespan is to be managed in the secure electronic entity:

an identifier Id of the object, the above reference time of day Dref, and a predetermined lifespan V assigned to the object.

The operations that create an object naturally use secure mechanisms to protect the "lifespan" data item V.

The storage unit 19 may be lumped together with the EEPROM 23 and is advantageously a secure memory of the electronic entity 11 that in particular is not accessible from the outside. Alternatively, the storage unit 19 may be outside the secure electronic entity 11, in a secure external entity. In this case, the value(s) of the lifespan V and/or of the identifier Id and/or the reference time of day Dref are received from the outside, from a "trusted" third party (approved authority) by the secure electronic entity 11, by means of a secure protocol (i.e. a protocol employing cryptography) and are stored at least temporarily in a secure area of the electronic entity 11.

The secure electronic entity 11 further includes an updating and invalidation unit 21 controlled by the time measuring unit 18.

In accordance with the present invention, the storage unit 19 cooperates with the time measuring unit 18 to compare the elapsed time and the lifespan V, for example each time that the object is used or at any time at which the validity of the object has to be verified.

If, after comparing the elapsed time and the lifespan V, it is apparent that the lifespan has been reached or passed, the updating and invalidation unit 21 acts on the object, either to update its lifespan V in the storage unit 19, in order to extend the lifespan of the object, subject to the use of security mechanisms, or to update the object (for example by replacing an existing version of the object with a new version), or to inhibit the functioning of the object temporarily, for a predetermined time period, or even to render the object permanently unusable.

A region (for example a file) containing the time of day, for example in seconds, since the reference time of day Dref may be provided in the memory of the secure electronic entity 11.

Thereafter, before authorizing new use of the object, the time of day of the current use is compared with the reference time of day Dref. If the difference between the two times of day is equal to or greater than the lifespan V, the updating and invalidation unit 21 comes into action.

The invention has many possible applications, including:

limiting the lifespan of a microcircuit card as a function of the term of the agreement entered into by its user, to guarantee no hijacking and fraudulent use of the card beyond the intended time of use;

limiting the lifespan of a file system, in a similar manner;

commanding a periodic change by the user of the confidential code associated with use of the secure electronic entity;

defining when the validity of data contained in a file expires, after which reading of the data is rendered impossible or is at least accompanied by a warning to the user;

defining when the validity of an application expires, for example in the case of an application linked to a sporting, cultural or artistic event that is time-limited, after which the application is automatically eliminated;

defining when a free trial period of an evaluation version of software ends, after which the right to use the software may be extended subject to payment by the user and the use of a security mechanism;

managing electronic access rights to a piece of music, a film or the like via the Internet, in the form of a fixed-charge subscription of predetermined duration (for example one month) or as a function of the real time of use of the access rights (for example ten hours of listening);

and so on.

In the final application example referred to above, a user wishes to access the content of the Internet site of a musical content publisher for a defined time period, for example. To this end he purchases access rights to the musical content for a particular period, for example four hours. After verification, the publisher sends the secure electronic entity of the user a secure message granting listening rights for the intended time period. On receiving this message, the secure electronic entity creates in its memory a "listening right" object and initializes the lifespan V with the chosen value, i.e. four hours.

On the first use of the object, i.e. on the first access to the musical content, the secure electronic entity verifies the presence of the "listening right" object and stores the time of day at which listening begins. The user then accesses the musical content. On each request for secret decryption data, the secure electronic entity verifies the presence of the "listening right" object and its validity as a function of the updated time. If the difference between the current time of day and the reference time of day (which in this example is the time of day at which listening begins) is less than four hours, the right is still valid and the secure electronic entity supplies the secret data, which is used to decrypt the musical content. On the other hand, if that difference is equal to or greater than four hours, the right is no longer valid and the secret decoding data is not supplied. The electronic entity can also invalidate the "listening right" object temporarily, or even destroy it.

If the user stops using the "listening right" object before the right expires, the lifespan of the object is updated as a function of the remaining time: the new value of the lifespan is equal to the previous lifespan less the current time of day and the time of day at which listening began.

In another example of an application of the invention, in the field of mobile telecommunications, the secure electronic entity may be a smart card of the SIM card type and the object may be an SAT (SIM application toolkit) application as defined in particular by the GSM 03.48 standard. The applications may be loaded at the time of customizing the SIM card or downloaded, either using the SMS (Short Message Service) technology, also defined by the GMS standard cited above, or via a reader connected to a computer in turn connected to a card management center.

The electronic entity manages a table of SAT applications containing, for each application, an identifier AID of the application, a reference time of day (for example the time of day the application was created), and the lifespan of the application.

Each time the application is started, the SIM card uses the time measuring unit to determine if the application is still valid. If not, i.e. if the difference between the current time of day and the time of day the application was created is equal to or greater than the lifespan of the application, the card sends a Delete_application (AID) administrative command and updates the table of SAT applications.

Figure 2:
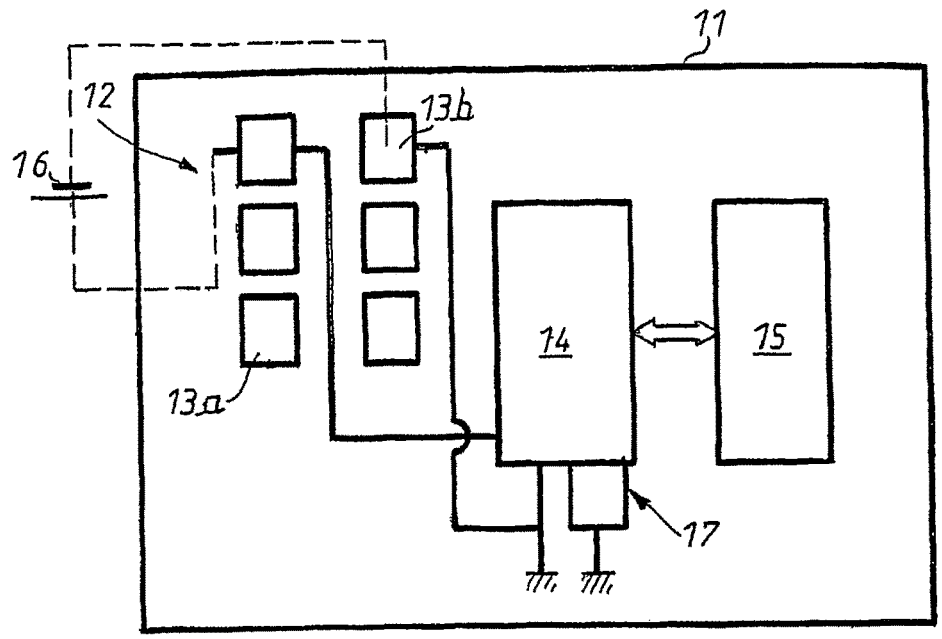
FIG. 2 is a block diagram of a microcircuit card to which one particular embodiment of the invention may be applied.

FIG. 2 shows one particular embodiment of a secure electronic entity 11 conforming to the present invention taking the form of a microcircuit card. The secure electronic entity 11 includes a unit 12 for coupling it to an external electrical power supply 16.

In the particular embodiment shown, the secure electronic entity 11 includes metal connection areas adapted to be connected to a unit forming a card reader. Two connection areas 13a, 13b are reserved for supplying electrical power to the microcircuit, the electrical power supply being in a server or other device to which the secure electronic entity is momentarily connected. These connection areas may be replaced by an antenna housed in the thickness of the card and adapted to supply the microcircuit with the electrical energy it needs as well as providing bidirectional transmission of radio-frequency signals for exchanging information. This is known as contactless technology.

The microcircuit comprises a microprocessor 14 conventionally associated with a memory 15.

One particular embodiment of the secure electronic entity 11 includes (or is associated with) one or more time measuring subsystems 17.

Figure 3:
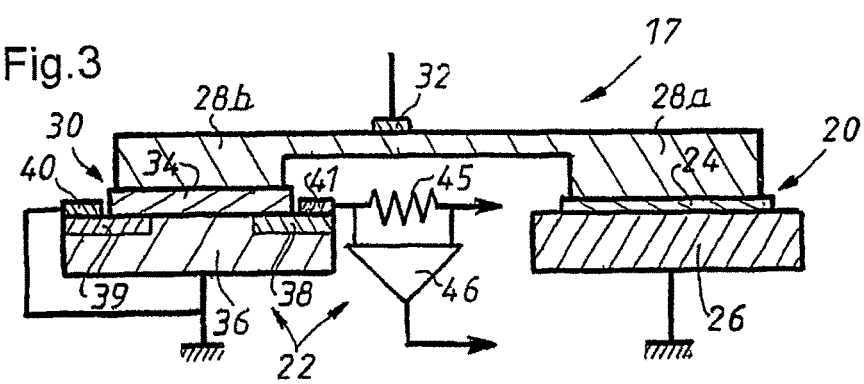
FIG. 3 is a theoretical diagram of a subsystem that one particular embodiment of the secure electronic entity may include.

The subsystem 17, which is shown in more detail in FIG. 3, is therefore accommodated in the secure electronic unit 11. It may form part of the microcircuit and may be implemented in the same integration technology as the microcircuit.

The subsystem 17 comprises a capacitive component 20 subject to leakage across its dielectric space 24 and a unit 22 for measuring the residual charge in the component 20.

The residual charge is at least in part representative of the time elapsed since the capacitive component 20 was decoupled from the electrical power supply, that is to say, in the present example, from the reference time of day Dref associated with the object whose lifespan is to be monitored.

The capacitive component 20 is charged by the external electrical power supply either via a direct connection, as in the present example, or by any other means for charging the gate. The tunnel effect is one method of charging the gate with no direct connection. In the present example, the microprocessor 14 controls the charging of the capacitive component 20.

In the present example, the capacitive component 20 is an MOS technology capacitor. The dielectric space 24 of the capacitor consists of a layer of silicon oxide deposited on the surface of a substrate 26 constituting one plate of the capacitor. Here the substrate 26 is grounded, i.e. connected to one of the power supply terminals of the external electrical power supply when the latter is connected to the card. The other plate of the capacitor is a conductive deposit 28a applied to the other face of the layer of silicon oxide.

The measuring unit 22 mentioned above essentially comprises a field-effect transistor 30, here implemented in the MOS technology, like the capacitor. The gate of the transistor 30 is connected to a terminal of the capacitive component 20. In the present example, the gate is a conductive deposit 28b of the same kind as the conductive deposit 28a which constitutes one of the plates of the capacitive component 20 (see above).

The two conductive deposits 28a and 28b are connected together or constitute a single conductive deposit. A connection 32 connected to the microprocessor 14 is used to apply a voltage to the two deposits 28a and 28b for a short time interval to charge the capacitive component 20. The microprocessor 14 controls the application of this voltage.

More generally, the connection 32 is used to charge the capacitive component 20 at a given time under the control of the microprocessor 14, and the discharging of the capacitive component 20 across its dielectric space 24 begins when this charging connection is broken by the microprocessor 14 or when the secure electronic entity 11 as a whole is decoupled from any electrical power supply, this loss of electric charge being representative of the elapsed time. Measuring the time involves turning the transistor 30 on momentarily, which presupposes the presence of an electrical power supply between its drain and source.

The MOS technology field-effect transistor 30 includes, in addition to the gate, a gate dielectric space 34 separating the gate from the substrate 36, in which a drain region 38 and a source region 39 are defined. The gate dielectric space 34 consists of an insulative layer of silicon oxide. The source connection 40 applied to the source region 39 is grounded and connected to the substrate 36. The drain connection 41 is connected to a drain current measuring circuit that includes a resistor 45 to opposite ends of which two inputs of a differential amplifier 46 are connected. The voltage delivered at the output of this amplifier is therefore proportional to the drain current.

The gate 28b is floating while the elapsed time is being measured relative to the lifespan of the object. In other words, no voltage is applied to the gate during this measurement. On the other hand, because the gate is connected to one plate of the capacitive component 20, the gate voltage while the elapsed time is being measured is equal to a voltage that develops between the terminals of the capacitive component 20, starting from an initial charging therein carried out under the control of the microprocessor 14 during the last use of the object.

The insulative layer of the transistor 30 is significantly thicker than that of the capacitive component 20. By way of non-limiting example, the thickness of the insulative layer of the transistor 30 may be about three times the thickness of the insulative layer of the capacitive component 20. Depending on the application envisaged, the thickness of the insulative layer of the capacitive component 20 is from about 4 nanometers to about 10 nanometers.

When the capacitive component 20 is charged by the external electrical power supply, and after the charging connection has been broken at the command of the microprocessor 14, the voltage across the capacitive component 20 decreases slowly as the latter is progressively discharged across its own dielectric space 24. Given its thickness, the discharge across the dielectric space 34 of the field-effect transistor 30 is negligible.

By way of non-limiting example, for a given dielectric space thickness, if the gate and the plate of the capacitive component 20 are charged to 6 volts at a time t=0, the time associated with a loss of charge of 1 volt, i.e. to a reduction of the voltage to 5 volts, is of the order of 24 seconds for a thickness of 8 nanometers.

The times for other thicknesses are set out in the following table:

|  | Time | | | |
|---|---|---|---|---|
|  | 1 hour | 1 day | 1 week | 1 month |
| Oxide thickness | 8.17 nm | 8.79 nm | 9.17 nm | 9.43 nm |
| Time accuracy | 1.85% | 2.09% | 2.24% | 3.10% |

The accuracy depends on the error in reading the drain current (approximately 0.1%). Accordingly, to be able to measure times of the order of one week, a dielectric space layer thickness of the order of 9 nanometers may be required.

FIG. 3 shows one particular architecture that uses a direct connection to the floating gate (28a, 28b) to apply an electric potential thereto and therefore to cause charges to transit. Another option is indirect charging, as mentioned above, by means of a control gate replacing the direct connection, using the technology employed to fabricate EPROM or EEPROM cells.

Figure 4:
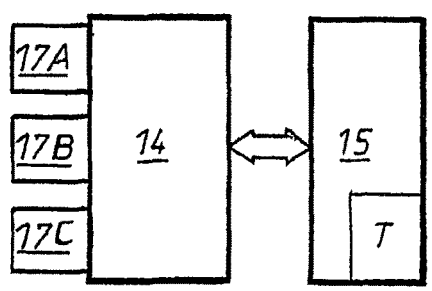
FIG. 4 is a block diagram of a variant of the embodiment shown in FIGS. 1 and 2.

The FIG. 4 variant provides three subsystems 17A, 17B, 17C each associated with the microprocessor 14. The subsystems 17A and 17B comprise capacitive components with relatively slow leakage to enable measurement of relatively long times.

However, these capacitive components are generally sensitive to temperature variations. The third subsystem 17C includes a capacitive component having a very thin dielectric space (less than 5 nanometers thick). It is therefore insensitive to temperature variations. The two capacitive components of the subsystems 17A, 17B have different leakages across their respective dielectric spaces.

Moreover, the secure electronic entity includes a module for processing respective residual charge measurements present in the capacitive components of the first two subsystems 17A, 17B. This processing module is adapted to extract from these measurements information that is representative of time and substantially independent of heat input to the secure electronic entity during the time elapsed since the reference time of day.

In the present example, this processing module is lumped together with the microprocessor 14 and the memory 15. In particular, space is reserved in the memory 15 for storing a double-entry table T of time values that is addressed by means of the respective measurements from the subsystems 17A and 17B. In other words, a portion of the memory includes a set of time values and each value corresponds to a pair of measurements resulting from reading the drain current of each of the two transistors of the temperature-sensitive subsystems 17A, 17B.

Accordingly, the two capacitive components are charged to a predetermined voltage by the external electrical power supply via the microprocessor 14 at the beginning of measuring the elapsed time. When the microcircuit card is decoupled from the server, card reader or other entity, the two capacitive components remain charged but begin to discharge across their respective dielectric spaces and, as time passes without the microcircuit card being used, the residual charge in each of the capacitive components decreases, but differently in the two components, because of the different leakage rates resulting from their respective designs.

When the card is again coupled to an external electrical power supply, for example on the occasion of a new use of the object, the residual charges in the two capacitive components are representative of the same time interval to be determined, but different because of any temperature variations that may have occurred during this time period.

When the object is used again, the two field-effect transistors of the two subsystems are supplied with energy and the drain current values are read and processed by the microcircuit. For each pair of values of the drain current, the microcircuit looks for the corresponding time value in memory, in the table T mentioned above. That time value is then compared to the lifespan V and use of the object is authorized only if the elapsed time is less than the lifespan V.

Alternatively, this time value may be compared to a value available in the server, card reader or some other (and preferably secure) entity. Moreover, use of the object may be authorized only if the elapsed time respects the lifespan of the object and the time value obtained in the card (for example the time value stored in the table T) is compatible with the value available in the server or card reader or other entity, i.e. if the two values also coincide or are relatively close together, within a preselected tolerance.

It is not necessary to store the table T. For example, the processing module, i.e. essentially the microprocessor 14, may include software for calculating a predetermined function for determining said information as a function of the two measurements and substantially independently of the heat input.

As described above, the third subsystem 17C includes an extremely thin dielectric space making it insensitive to temperature variations.

Other variants are feasible. In particular, to simplify the subsystem 17, the capacitive component 20 as such may be eliminated, because the field-effect transistor 30 may be considered as a capacitive component with the gate 28b and the substrate 36 as its plates, separated by the dielectric space 34. In this case, the capacitive component and the measuring unit may be regarded as lumped together.

There are a number of options for preserving the time indication between successive uses of the object.

A first option is to charge the cell that measures time once, when the object is created. On each attempt to use the object, the charge in the time measuring cell is representative of the time that has elapsed since the creation of the object. That time is compared to the lifespan assigned to the object and use of the object is authorized only if the elapsed time does not exceed the lifespan.

A second option is to recharge the cell each time that the secure electronic entity is switched on. Thus shorter times are measured, and are accumulated: each time the secure electronic entity is switched on, the time elapsed since the last time the secure electronic entity was switched on is measured, after which the capacitive component is recharged. The times measured in this way are accumulated in a location of the non-volatile memory of the electronic entity.

That memory location therefore stores the time elapsed since the first time the secure electronic entity was switched on, and so it is possible to determine at any time the time that has elapsed since the reference time of day, independently of the total real time of use of the object.

It is advantageous to use a single capacitive component for a plurality of objects. This has the advantage of using a single capacitive component having a relatively thin oxide layer, which makes time measurement more accurate compared to using a single component for the whole of the lifespan of the electronic entity.

The time that elapses between the time of measuring the charge on the capacitive component and the time that it is recharged is sometimes non-negligible. To take account of this, a second component may be used whose function is to take over from the first during this time interval.

Capacitive components of different accuracy may also be used to improve the accuracy of the measurement; from a plurality of measurements, the measurement obtained from the most accurate component that has not been discharged is chosen.

A third option is to use one capacitive component for each object, recharged at the beginning of the lifespan of the object. An advantage of this option is that time measurement components may be used that are adapted to the lifespan of the object in question, for improved accuracy of time measurement; the table hereinabove shows that the selected oxide thickness in the time measuring cell impacts on measurement accuracy.

On each attempt to use the object, the state of charge of the capacitive component associated with the object is representative of the time that has elapsed since the object was created. That time is compared to the lifespan assigned to the object and use of the object is authorized only if the elapsed time does not exceed the lifespan.

Alternatively, the lifespan may correspond to the total time of real use of the object, in which case, each time the object is used, the time elapsed between starting and ending its use is measured and stored, and all the times measured in this way are accumulated; thus the total elapsed time that is measured corresponds to the total time of real use of the object.

Other variants are feasible that will be obvious to the person skilled in the art.

Thus, according to the invention, the use of the time counter within the card improves security since downcounting time is difficult to falsify.

The invention claimed is:

1. A secure electronic entity, comprising:
   a microprocessor;
   a memory apparatus having stored therein at least one object that comprises content including any of data and/or functions, said object constituting an application, operable by said microprocessor to cause the microprocessor to operate in a predetermined manner, stored in the memory apparatus having a lifespan associated therewith;
   a time measuring apparatus that measures a time that has elapsed from a reference time associated with said object, the time measuring apparatus comprising one or more subsystems, each subsystem of said one or more subsystems comprising
      a capacitive component subject to leakage across a dielectric space of the capacitive component,
      a coupling structure that couples said capacitive component to an electrical power supply to be charged by said electrical power supply, and a charge measuring device that measures a residual charge in the capacitive component, said residual charge being at least in part representative of a time that has elapsed since the capacitive component was decoupled from the electrical power supply; and a storage apparatus that stores a value of said lifespan associated with said object in the memory apparatus, the storage apparatus co-operating with the time measuring apparatus to compare the elapsed time and said lifespan, said time measuring apparatus configured to, upon a result of said comparison being that the elapsed time has reached or passed the lifespan of the object in the memory apparatus, perform any of i) update said lifespan of the object stored in the memory apparatus and ii) render the content of the object stored in the memory apparatus unusable, and said time measuring apparatus being configured to provide a measurement of the time that has elapsed from the reference time associated with said object when said electronic entity is not supplied with electrical power.

2. The secure electronic entity according to claim 1, wherein said lifespan corresponds to a total time of real use of the object.

3. The secure electronic entity according to claim 2, wherein the time measuring apparatus is adapted to supply a measurement of the time that has elapsed since the reference time upon the electronic entity not being supplied with electrical power.

4. The secure electronic entity according to claim 1, wherein said lifespan is a time period independent of a total time of real use of the object.

5. The secure electronic entity according to claim 1, wherein the time measuring apparatus is adapted to provide a measurement of the time that has elapsed since the reference time upon the electronic entity not being supplied with power by an external power supply.

6. The secure electronic entity according to claim 1, wherein the time measuring apparatus is adapted to supply a measurement of the time that has elapsed since the reference time independently of any external clock signal.

7. The secure electronic entity according to claim 1, wherein the time measuring apparatus is configured to compare two times of day.

8. The secure electronic entity according to claim 1, wherein the memory apparatus that stores the lifespan includes another secure entity situated inside or outside said secure electronic entity.

9. The secure electronic entity according to claim 1, wherein the reference time is a time of day of creation of the object.

10. The secure electronic entity according to claim 1, wherein said charge measuring device is included in said time measuring apparatus.

11. The secure electronic entity according to claim 10, wherein the capacitive component is a metal oxide semiconductor (MOS) capacitor whose dielectric space consists of a silicon oxide.

12. The secure electronic entity according to claim 1, wherein the capacitive component is a metal oxide semiconductor (MOS) capacitor whose dielectric space consists of a silicon oxide.

13. The secure electronic entity according to claim 1, wherein the charge measuring device comprises a field-effect transistor having an insulative layer, wherein the capacitive component includes an insulative layer, and wherein a thickness of the insulative layer of the field-effect transistor is greater than a thickness of the insulative layer of the capacitive component.

14. The secure electronic entity according to claim 13, wherein the thickness of the insulative layer of the capacitive component is from 4 to 10 nanometers.

15. The secure electronic entity according to claim 1,
wherein the time measuring apparatus comprises at least two of said subsystems,
wherein said capacitive components of said at least two subsystems have different leaks across respective dielectric spaces of said capacitive components, and
wherein the time measuring apparatus also includes a charge information processor that measures respective measured residual charges in said at least two capacitive components to extract information from said measurements independent of heat input to said electronic entity during the time that has elapsed since the reference time.

16. The secure electronic entity according to claim 15, wherein said charge information processor is in communication with a data store having software stored thereon for causing the charge information processor to calculate a predetermined function for determining said information as a function of said measurements and substantially independently of heat input.

17. The secure electronic entity according to claim 1, configured as a microcircuit card.

18. The secure electronic entity according to claim 1, configured as a Personal Computer Memory Card International Architecture (PCMCIA) card.

19. The secure electronic entity according to claim 1, configured as a Subscriber Identity Module (SIM) card.

20. The secure electronic entity according to claim 1, wherein the reference time is set at the creation of the object.

21. The secure electronic entity according to claim 1, wherein the coupling structure is adapted to only couple once to the capacitive component to the electrical power supply.

22. The secure electronic entity according to claim 1, wherein the coupling structure is adapted to couple the capacitive component to the electrical power supply each time the secure electronic entity is energized.

23. The secure electronic entity according to claim 1, comprising more than one object stored in the memory apparatus, and a respective time measuring apparatus for each of said more than one object.

24. The secure electronic entity according to claim 1,
wherein said electrical power supply is an external power supply,
and
wherein said residual charge decreases as a function of time from a moment when said capacitive component is decoupled from the external power supply.

25. A secure electronic entity, comprising:
a microcircuit card, having provided thereon
a memory device having stored therein an object comprising content constituting an application, operable by said microprocessor to cause the microprocessor to operate in a predetermined manner,
a time measuring device that measures a time that has elapsed from a reference time associated with the content of any of said object, said time measuring device comprising a capacitive component subject to leakage across a dielectric space of the capacitive component, a coupling structure that couples said capacitive component to an electrical power supply to be charged by said electrical power supply, and a charge measuring device that measures a residual charge in the capacitive component, said residual charge being at least in part representative of a time that has elapsed since the capacitive component was decoupled from the electrical power supply, and a storage device having stored therein a lifespan assigned to the content of any of said object, the storage device co-operating with the time measuring device to compare the elapsed time and said lifespan, said time measuring device configured to update said lifespan of the content of the application upon a result of said comparison being that the elapsed time has reached or passed the lifespan, and said time measuring device being adapted to provide a measurement of the time that has elapsed from the reference time associated with said application when said electronic entity is not supplied with electrical power, wherein said microcircuit card is any of a bank card, an access control card, an identity card, a SIM card, or a removable memory card.

26. A secure electronic entity, comprising:

a memory device having stored therein code, readable by a microprocessor, that corresponds to at least one data object that comprises content including data stored in the memory device, and a lifespan associated therewith, said at least one data object constituting access rights required for a user to access to digital content in the form of either a fixed-charge subscription to the content of predetermined duration or a fixed time-limit imposed upon use to the content;

a time measuring apparatus that measures a time that has elapsed from a reference time associated with the content of said object in the memory device, said time being independent of a total real time or real use of the content of the object in the memory device, said time measuring apparatus configured to function whether or not said electronic entity is supplied with electrical power, said time measuring apparatus comprised of one or more subsystems, each subsystem of said one or more subsystems comprising a capacitive component subject to leakage across a dielectric space of the capacitive component, a coupling structure that couples said capacitive component to an electrical power supply to be charged by said electrical power supply, and a charge measuring device that measures a residual charge in the capacitive component, said residual charge being at least in part representative of a time that has elapsed since the capacitive component was decoupled from the electrical power supply;

and a data storage apparatus that stores data corresponding to said lifespan associated with the content of said object in the memory device, the time measuring apparatus configured to co-operate with the data storage apparatus to perform a comparison of the elapsed time and said lifespan, wherein the time measuring apparatus is configured to, upon a result of said comparison being that the elapsed time has reached or passed said lifespan, write to the memory device in order to cause the content of the at least one data object in the memory device to become temporarily or permanently unusable.

* * * * *